(12) United States Patent
Denkmaier

(10) Patent No.: US 6,790,028 B2
(45) Date of Patent: Sep. 14, 2004

(54) INJECTION MOLDING APPARATUS

(75) Inventor: Klaus Denkmaier, Bad Zell (AT)

(73) Assignee: Engel Mashinenbau Gesellschaft m.b.H., Schwertberg (AT)

(*) Notice: Subject to any disclaimer, the term of this patent is extended or adjusted under 35 U.S.C. 154(b) by 0 days.

(21) Appl. No.: 10/301,132

(22) Filed: Nov. 21, 2002

(65) Prior Publication Data

US 2003/0099738 A1 May 29, 2003

(30) Foreign Application Priority Data

Nov. 26, 2001 (AU) .......................................... GM 914/01

(51) Int. Cl.[7] .............................................. B29C 45/18
(52) U.S. Cl. ..................................... 425/574; 425/576
(58) Field of Search ................................ 425/574, 575, 425/576

(56) References Cited

U.S. PATENT DOCUMENTS 3,205,536 A * 9/1965 Funck .......................... 425/574
3,663,139 A * 5/1972 Robbins et al. ............. 425/575
4,276,318 A * 6/1981 Orlowski et al. ........... 425/576

FOREIGN PATENT DOCUMENTS

JP 61248713 11/1986
JP 8174594 7/1996

* cited by examiner

Primary Examiner—Tim Heitbrink
(74) Attorney, Agent, or Firm—Notaro & Michalos P.C.

(57) ABSTRACT

An injection molding apparatus comprising a rotary table (1) which is rotatable about its axis of symmetry (17) for fixing a plurality of mold halves, wherein for the feed flow, which occurs at the center of the rotary table (1), of media which are capable of flow, there is provided a media coupling (8) which is arranged at a spacing from the rotary table and which has a stationary part a part rotatable together with the rotary table, and wherein tire media coupling (8) is arranged eccentrically with respect to the axis (17) of the rotary table (1) and that provided between the media coupling (8) and the rotary table (1) is a connecting bar (14) provided at both ends with universal joints (15).

2 Claims, 2 Drawing Sheets

INJECTION MOLDING APPARATUS

FIELD AND BACKGROUND OF THE INVENTION

The invention relates to an injection molding apparatus comprising a rotary table which is rotatable about its axis of symmetry for fixing a plurality of mold halves, wherein for the feed flow, which occurs at the center of the rotary table, of media which are capable of flow, there is provided a media coupling which is arranged at a spacing from the rotary table and which has a stationary part and a part rotatable together with the rotary table.

In known apparatuses of that kind the media coupling is arranged symmetrically with respect to the axis of the rotary table. So that the rotatable part of the coupling moves synchronously with respect to the rotary table, it is sufficient for the coupling and the rotary table to be connected non-rotatably by means of a tube. As the rotary table is lifted somewhat in each rotary movement, the tube is in the form of a sliding sleeve which co-operates with a spline shaft profile.

The connecting tube between the rotary table and the media coupling has to be taken past the movable mold mounting plate as well as the injection unit with the plasticising cylinder. This means that those machine components have to be considerably displaced out of the center of the rotary table, which increases the diameter of the rotary table and causes higher costs.

SUMMARY OF THE INVENTION

The object of the invention is so to dispose the connecting tube between the rotary table and the media coupling that the area of the rotary table can be put to maximum possible use. In return it is accepted that the non-rotatable connection of the coupling and the rotary table can no longer be of such a simple design configuration as hitherto. In accordance with the invention it is provided in that sense that the media coupling is arranged eccentrically with respect to the axis of the rotary table and that provided between the media coupling and the rotary table is a connecting bar provided at both ends with universal joints.

BRIEF DESCRIPTION OF THE DRAWINGS

Details of the invention are described hereinafter with reference to the drawing in which.

DESCRIPTION OF THE PREFERRED EMBODIMENTS

Figure 1:
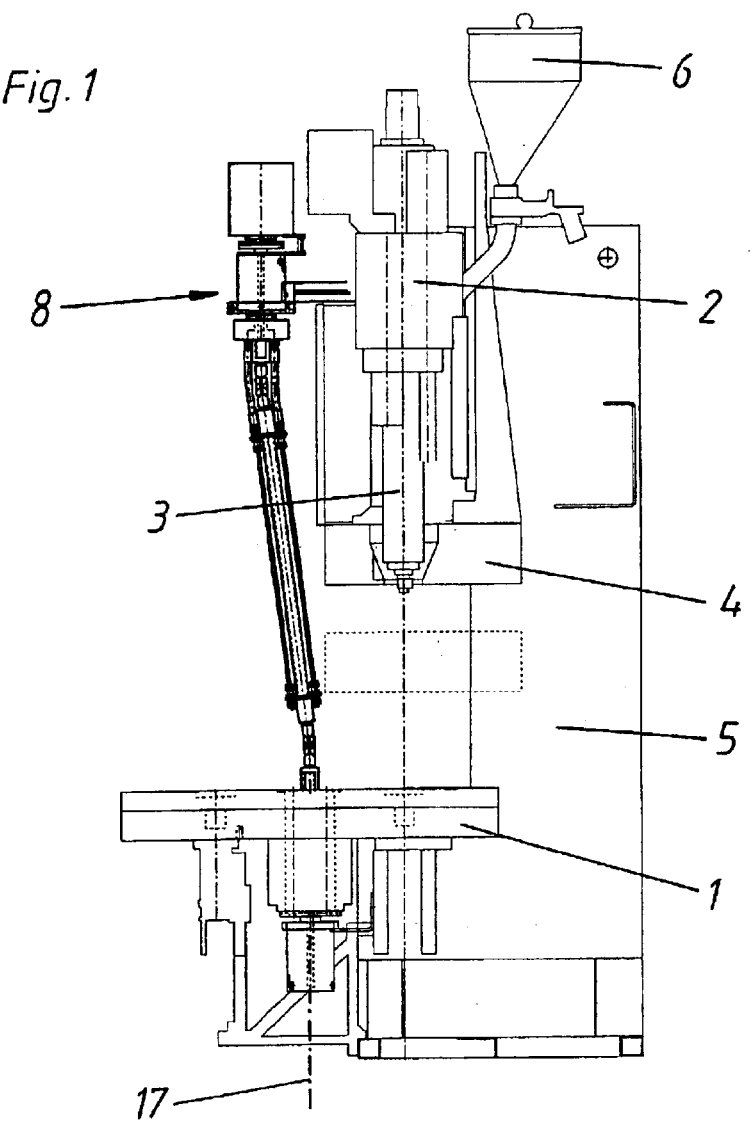
FIG. 1 shows an explanatory side view of an apparatus according to the invention.

The injection molding apparatus shown in FIG. 1 has a vertically arranged C-shaped frame carrying an injection unit 2 with a plasticising cylinder 3. A plurality of mold halves (not shown) are provided between a movable mold mounting plate 4 and a rotary table 1, wherein rotary movement of the rotary table 1 about its axis 17 causes a respective different mold half to be moved into position in front of the plasticising cylinder 3. Thereupon the material which is supplied by way of the material hopper 6 and metered in the plasticising cylinder 3 is injected into the corresponding mold.

Figure 2:
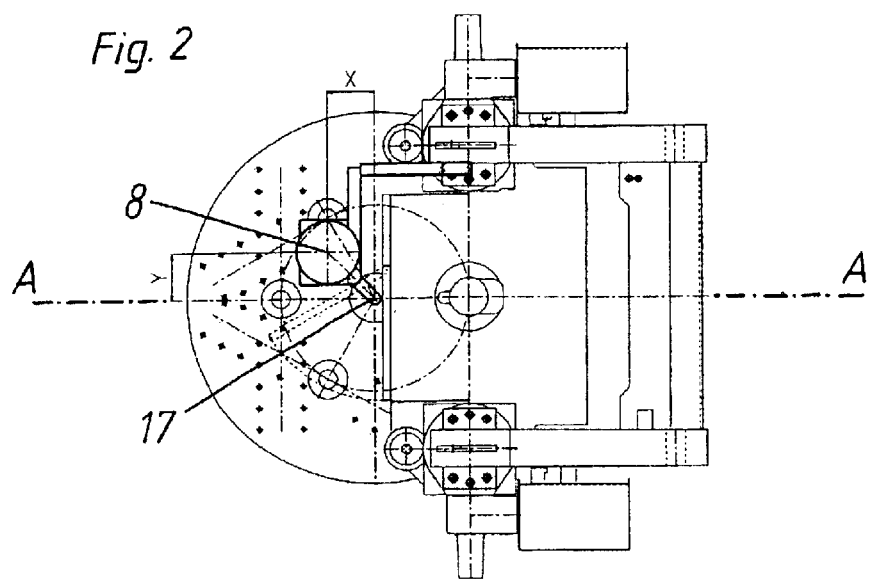
FIG. 2 shows the associated plan view.

In order to ensure that the moldings harden quickly, cooling fluid flows around the molds. That cooling fluid is fed to the rotary table 1 and by way thereof to the molds by way of a media coupling 8, the structure of which is known per se and can be seen in detail from FIG. 3. What is essential for the invention is the measure that the media coupling 8 is arranged eccentrically relative to the axis 17. If, from the point of view of the operator, that displacement is only effected forwardly, that is to say towards the left in FIGS. 1 and 2 (displacement X), accessibility to the mold region is slightly worsened. If in contrast it is also effected in a lateral direction as a displacement out of the central plane A—A of the C-shaped frame 5, the invention affords not only better utilization of the area of the rotary table 1 but also provides for better accessibility thereto.

Figure 3:
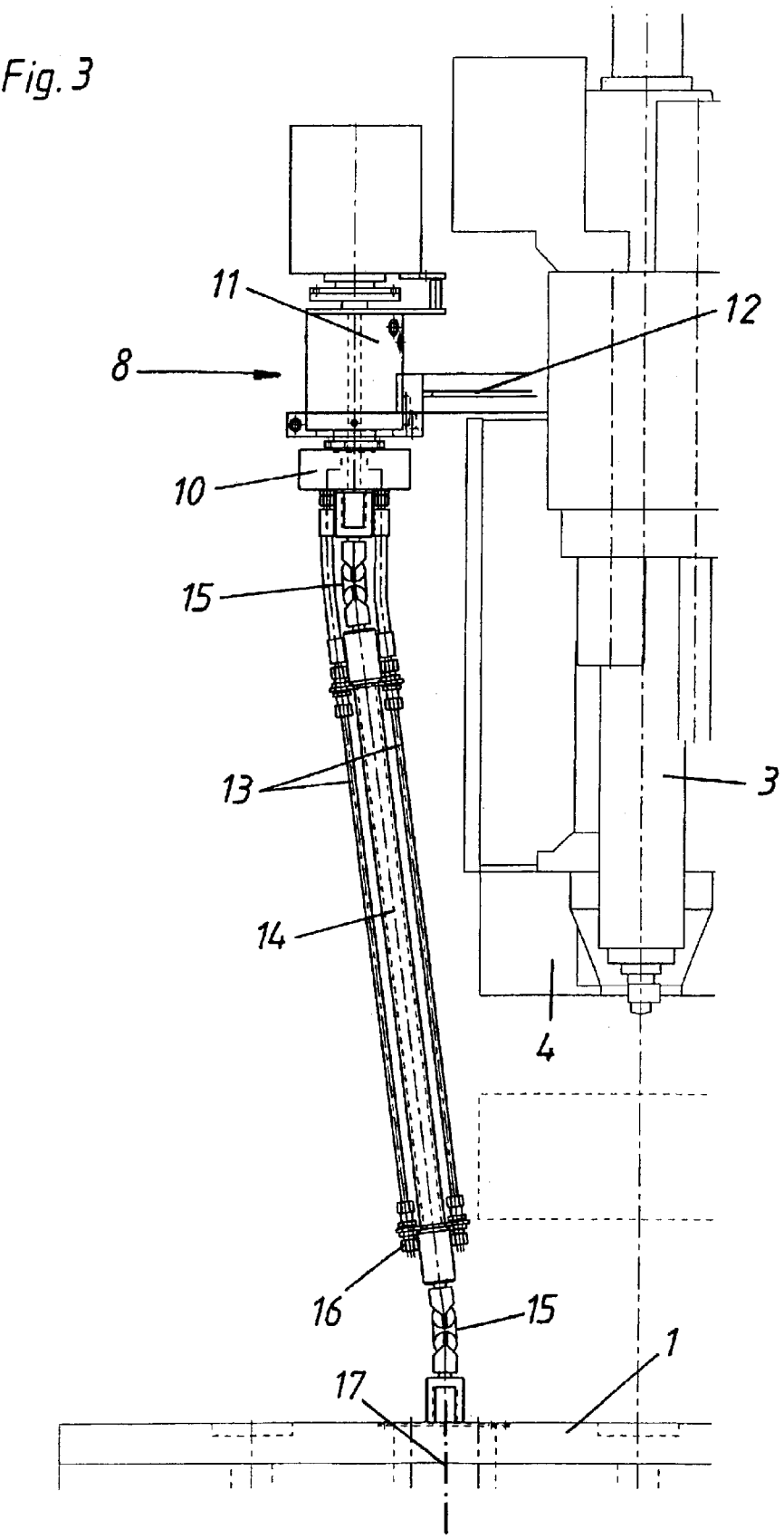
FIG. 3 shows a view on an enlarged scale of the essential region of FIG. 1.

FIG. 3 shows the non-rotatable connection of the rotary table 1 and the media coupling 8 in detail. The media coupling 8 comprises a stationary part 11 which is connected to a holder 12. That stationary part can for example have a slip ring collector for the feed of electrical power. At any event however it includes connections for a medium which is capable of flow. They pass through a conventional rotary transfer means in the rotatable part 10 of the media coupling 8, which is non-rotatably connected to the rotary table 1. That non-rotatable connection is implemented through a connecting bar 14 which is in the form of a tube and which carries universal joints 15 at both ends. As is known the universal joints 15 can permit a slight heightwise displacement of the rotary table 1 when the holder 12 is fixed. The media are transported by means of hoses 13 which can be prolonged by means of connecting screw arrangements 16.

As can be seen in particular from FIG. 3 the construction according to the invention permits the movable mold mounting plate 4 to be moved extremely close to the axis 17 of the rotary table and thus allows the rotary table 1 to be of an extremely inexpensive configuration.

What is claimed is:

1. An injection molding apparatus comprising a rotary table which is rotatable about its axis of symmetry for fixing a plurality of mold halves, wherein for the feed flow, which occurs at the center of the rotary table, of media which are capable of flow, there is provided a media coupling which is arranged at a spacing from the rotary table and which has a stationary part and a part rotatable together with the rotary table, characterised in that the media coupling is arranged eccentrically with respect to the axis of the rotary table and that provided between the media coupling and the rotary table is a connecting bar provided at both ends with universal joints.

2. An apparatus as set forth in claim 1 characterised in that the media coupling is displaced laterally with respect to the central plane of the C-shaped frame of the apparatus.

* * * * *